Patented Nov. 28, 1939

2,181,719

UNITED STATES PATENT OFFICE 2,181,719

PRESERVATION OF RUBBER

William Baird and Maldwyn Jones, Blackley, Manchester, England, assignors to Imperial Chemical Industries Limited, a corporation of Great Britain No Drawing. Original application May 21, 1936, Serial No. 81,124. Divided and this application February 2, 1937, Serial No. 123,601. In Great Britain May 24, 1935

8 Claims. (Cl. 18—50)

This invention relates to the preservation of rubber.

It is well known to those engaged in the manufacture of rubber articles that rubber, even after vulcanization, deteriorates with the passage of time, with exposure to air and light, and under the influence of other agencies and circumstances. This process of deterioration is believed to be at least in part one of oxidation, because it can be greatly accelerated by oxygen. To reduce this deterioration, substances known as antioxidants or antiagers have been added to the rubber, and their use has become an established industrial practice. These antioxidants are usually organic chemical compounds. These compounds, whether or not colored themselves, frequently cause discoloration of the rubber article, either during compounding, vulcanizing or subsequent exposure. This discoloration is commonly spoken of as staining. While staining is not a disadvantage in making many rubber articles, such as for example tyre treads it is a disadvantage in some, particularly where a white or pale colored rubber article is required, as in certain floor covering materials and wearing apparel. Hitherto, the antioxidants, which have been most effective in preventing deterioration have also caused staining, and conversely those which have been satisfactory or nearly satisfactory as regards non-staining have fallen short in preventing deterioration.

An object of the present invention is to incorporate in rubber a new class of compounds which will retard that deterioration which rubber normally undergoes through the action of heat, light and oxygen. A further object is to incorporate in rubber a class of compounds of the above type which do not stain the rubber to a material extent even on exposure to ultraviolet light. Still further objects are to provide new compositions of matter and to advance the art. Other objects still appear hereinafter.

These objects may be accomplished in accordance with our invention which comprises providing compounds obtainable by interacting equimolecular proportions of a xylenol, formaldehyde and a member of the class consisting of piperidines, morpholines and dialkylamines in which each alkyl group contains 1 to 4 carbon atoms. By the term "piperidines" and "morpholines" as employed herein and in the claims, we mean "piperidine," "morpholine" and their homologues, such as for example, pipecolines, lupetidines, a-ethyl-piperidine, a-propyl-piperidine, tetrahydroquinoline and tetrahydroquinalidine and the like in which the sole substituents are hydrocarbons. By the term "a xylenol" as employed herein and in the claims, we mean any of the isomeric xylenols. However, for our purpose, the compounds prepared from the 1:3:2-xylenol are the most desirable and are the preferred compounds.

The compounds of our invention may be made by reacting one mole of formaldehyde with one mole of piperidine, morpholine or dialkylamine and then reacting the resulting product with one mole of xylenol. We have found that the resulting products, when incorporated in rubber by any of the methods ordinarily employed in practice, confer on the rubber high resistance to aging without staining it or staining it more than slightly.

Our invention is illustrated by the following table, which shows the results of tests carried out on vulcanized rubber with 5 of the compounds.

| Antioxidant | Tensile strength in kg/sq. cm. | | | Staining after exposure to ultraviolet light |
|---|---|---|---|---|
| | Before ageing | After 2 days ageing | After 4 days ageing | |
| 5-piperidinomethyl-1:3:2-xylenol (M. P. 119–120° C.) | 173 | 161 | 137 | Similar to blank. |
| 5-dimethylamino-methyl-1:3:2-xylenol (M.P. 103–105° C.) | 179 | 161 | 138 | Do. |
| Diethylamino-methyl-1:3:2-xylenol (a viscous oil) | 162 | 142 | 117 | Do. |
| Dibutylamino-methyl-1:3:2-xylenol (a viscous oil) | 163 | 145 | 108 | Do. |
| Morpholino methyl-1:3:2-xylenol (a soft resin) | 168 | Not tested | 100 | Do. |

The vulcanized rubber used in the test was made from the following mix, in which the parts are by weight:

| | Parts |
|---|---|
| Pale crepe rubber | 100 |
| Zinc oxide | 10 |
| Blanc fixe | 75 |
| Stearic acid | 1 |
| Sulphur | 3 |
| Diphenylguanidine | 0.5 |
| Antioxidant | 1 |

The testing was carried out by subjecting samples of the vulcanizates to artifical ageing for 4 days at 70° C. in oxygen at 300 lb./sq. in. pressure, and then ascertaining the tensile strength of the aged products. They were also subjected to ultraviolet light for 8 hours and examined for any discoloration.

This is a division of our co-pending application Ser. No. 81,124, filed May 21, 1936, entitled "Preservation of rubber."

While we have disclosed the preferred embodiments of our invention and the preferred modes of carrying the same into effect, it will be readily apparent to those skilled in the art that many variations and modifications may be made therein without departing from the spirit of our invention. For example, other dialkylamines which may be employed in accordance with our invention are diethylamine, diphopylamine, dibutylamine, methyl ethylamine and their isomers such as di-isopropylamine, di-isobutylamine and the like. Accordingly, the scope of our invention is to be limited solely by the appended claims construed as broadly as is permissible in view of the prior art.

We claim:

1. The method of preserving rubber which comprises incorporating therein a 1:3:2-xylenol substituted in the 5-position by a methyl group having one hydrogen replaced by an amino radical, in which the amino radical is a member of the group consisting of piperidino, morpholino and dialkylamino radicals, each alkyl group containing 1 to 4 carbon atoms.

2. The method of preserving rubber which comprises incorporating therein a 5-dialkylaminomethyl 1:3:2-xylenol, in which each alkyl group contains 1 to 4 carbon atoms.

3. The method of preserving rubber which comprises incorporating therein 5-dimethylaminomethyl 1:3:2-xylenol.

4. The method of preserving rubber which comprises incorporating therein 5-piperidinomethyl 1:3:2-xylenol.

5. Rubber having incorporated therein a 1:3:2-xylenol substituted in the 5-position by a methyl group having one hydrogen replaced by an amino radical, in which the amino radical is a member of the group consisting of piperidino, morpholino and dialkylamino radicals, each alkyl group containing 1 to 4 carbon atoms.

6. Rubber having incorporated therein a 5-dialkylaminomethyl 1:3:2-xylenol, in which each alkyl group contains 1 to 4 carbon atoms.

7. Rubber having incorporated therein 5-dimethylaminomethyl 1:3:2-xylenol.

8. Rubber having incorporated therein 5-piperidinomethyl 1:3:2-xylenol.

WILLIAM BAIRD.
MALDWYN JONES.

CERTIFICATE OF CORRECTION.

Patent No. 2,181,719.  November 28, 1939.

WILLIAM BAIRD, ET AL.

It is hereby certified that error appears in the printed specification of the above numbered patent requiring correction as follows: Page 2, first column, line 18, for "diphopylamine" read dipropylamine; and second column, line 10, claim 3, for "ethyl" read methyl; and that the said Letters Patent should be read with this correction therein that the same may conform to the record of the case in the Patent Office.

Signed and sealed this 2nd day of January, A. D. 1940.

(Seal)

Henry Van Arsdale,
Acting Commissioner of Patents.